United States Patent [19]

Hoel

[11] 4,110,497
[45] Aug. 29, 1978

[54] STRIPED LAMINATE AND METHOD AND APPARATUS FOR MAKING SAME

[75] Inventor: Steven Michael Hoel, Bolivar, Ohio

[73] Assignee: Snyder Manufacturing Co., Ltd., New Philadelphia, Ohio

[21] Appl. No.: 702,226

[22] Filed: Jul. 2, 1976

[51] Int. Cl.² ............................................. B32B 3/16
[52] U.S. Cl. ...................................... 428/190; 156/298; 156/308; 156/324; 428/189; 428/247; 428/252; 428/255
[58] Field of Search ................. 428/78, 77, 79, 190, 428/189, 138, 287, 286, 255, 195, 196, 31, 518, 483, 474, 107, 114, 246–247, 172; 156/272, 306, 554, 299, 298, 308, 324; 40/135, 137

[56] References Cited

U.S. PATENT DOCUMENTS

| | | | |
|---|---|---|---|
| 2,539,690 | 1/1951 | Boorn | 156/298 |
| 2,662,033 | 12/1953 | Andrew | 40/2 R |
| 2,706,699 | 4/1955 | Plansoen et al. | 428/518 |
| 2,804,419 | 8/1957 | De Woskin | 156/305 |
| 2,981,637 | 4/1961 | Spencer | 428/518 |
| 3,222,237 | 12/1965 | McKelvy | 428/172 |
| 3,307,992 | 3/1967 | Condon et al. | 428/107 |
| 3,309,804 | 3/1967 | Gill | 40/135 |
| 3,399,165 | 8/1968 | Berger et al. | 428/195 |
| 3,644,165 | 2/1972 | Chen | 428/138 |
| 3,681,180 | 8/1972 | Kent | 428/31 |
| 3,814,658 | 6/1974 | Decker | 428/518 |

Primary Examiner—George F. Lesmes
Assistant Examiner—Alexander S. Thomas
Attorney, Agent, or Firm—Olson, Trexler, Wolters, Bushnell & Fosse, Ltd.

[57] ABSTRACT

A striped, flexible laminate sheet is disclosed, together with a method and apparatus for making the sheet. The sheet can include first and second plies, and an intermediate open woven scrim bonded together by a plastisol bonding agent. Atop one ply are heat-bonded one or more relatively narrow and thin polyvinyl chloride stripes. This product is manufactured by paying out sheet webs and applying a bonding agent to an underside of the top ply. Stripe material is payed out atop the top ply from payout rolls journaled on mounting arms. A heat roll and opposing nip roll join the laminate plies and simultaneously heat bond the stripe material to the top ply. The striped laminate web is then directed through chilling rolls where a web surface can be embossed with a pebbled or grained surface. After inspection, the product is wound upon a takeup roll.

5 Claims, 6 Drawing Figures

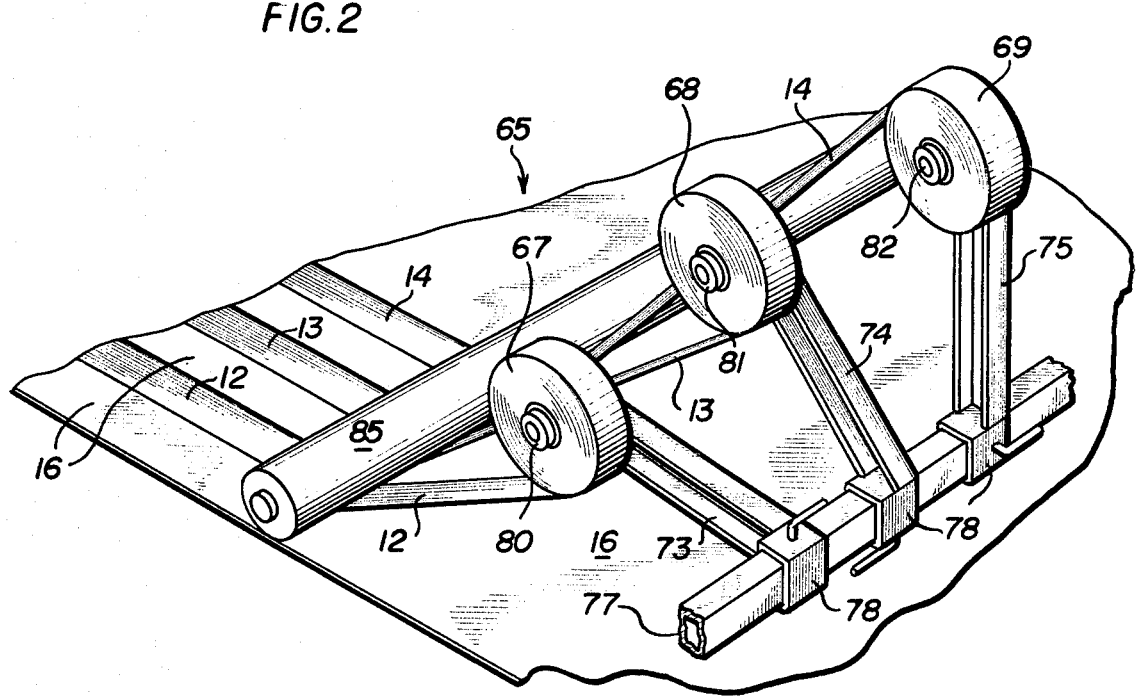

STRIPED LAMINATE AND METHOD AND APPARATUS FOR MAKING SAME

BACKGROUND OF THE INVENTION

This invention relates generally to flexible plasticized laminate sheets and more particularly concerns methods and apparatus for providing stripes on such a laminate, and the striped product itself.

Plasticized polyvinyl chloride sheets find use as flexible covers or barriers in an extraordinarily wide variety of applications. The extent of such use is only generally indicated by the fact that these ubiquitous materials can be found in such disparate applications as wind or draft barriers within mines, and as covers or tarpaulins for boats and the like. In many cases providing such sheets with a striped pattern enhances the material decoration, and in some cases acts as a warning or safety signal.

In at least some present fabrication practices, these polyvinyl chloride sheets are striped by a printing-like process. During striping operations, an ink or similar pigment of the desired color is applied in a stripe to the sheet. Sheets which have been so striped can exhibit signs of wear after long use in certain environments. Extended exposure to the sun or some chemicals can bleach or fade the stripe color. Abrasive activity can also damage the stripe pattern.

Accordingly, it is the general object of the present invention to provide a flexible canvas-like covering or sheet material having a striped design on at least one side, which striping is relatively impervious to wear and tear.

A more specific object of the invention is to provide a flexible canvas-like covering or sheet material having a striped design in which the striping exhibits wear resistance qualities comparable to the wear qualities of the sheet material itself.

Another object is to provide such a material in which stripe cracking and abrasion susceptibility is minimized. An associated object is to provide such a sheet material in which the problem of stripe separation from the laminate is minimized or eliminated entirely.

Yet another object is to provide apparatus for making this novel product in long or endless webs or sheets.

A related object is to provide such apparatus which can manufacture the novel product at low finished cost, yet provide high end product quality.

An associated object is to provide such apparatus in an embodiment which produces the novel end product rapidly, and which can be easily serviced even during production.

Other objects and advantages of the invention will become apparent upon reading the following detailed description, and upon reference to the drawings. Throughout the drawings, like reference numerals refer to like parts.

BRIEF DESCRIPTION OF THE DRAWINGS

FIG. 2 is a fragmentary perspective view showing a portion of the striping apparatus;

FIG. 3 is a fragmentary perspective view showing a portion of the laminating apparatus;

FIG. 4 is a fragmentary end view showing a portion of the end product;

DETAILED DESCRIPTION

While the invention will be described in connection with preferred embodiments and procedures, it will be understood that it is not intended to limit the invention to these embodiments or procedures. On the contrary, it is intended to cover all alternatives, modifications and equivalents as may be included within the spirit and scope of the invention as defined by the appended claims.

Figure 5:
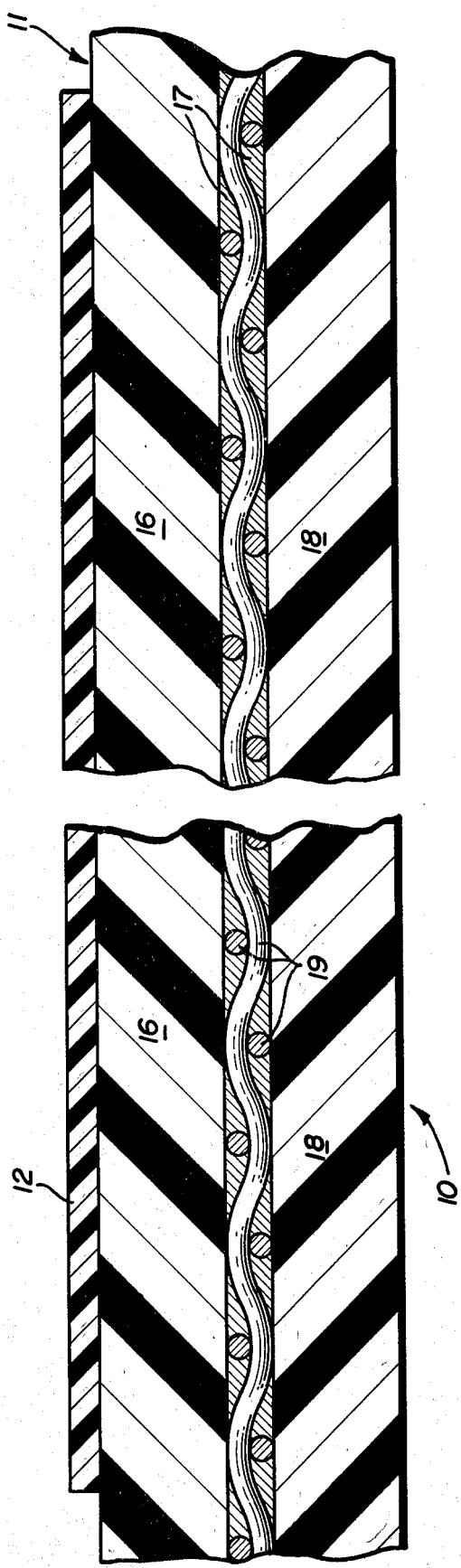
FIG. 5 is a sectional view taken substantially in the plane of line 5—5 in FIG. 4 and showing one embodiment of the novel end product, the thicknesses of the comprising materials being emphasized for clarity.
Figure 6:
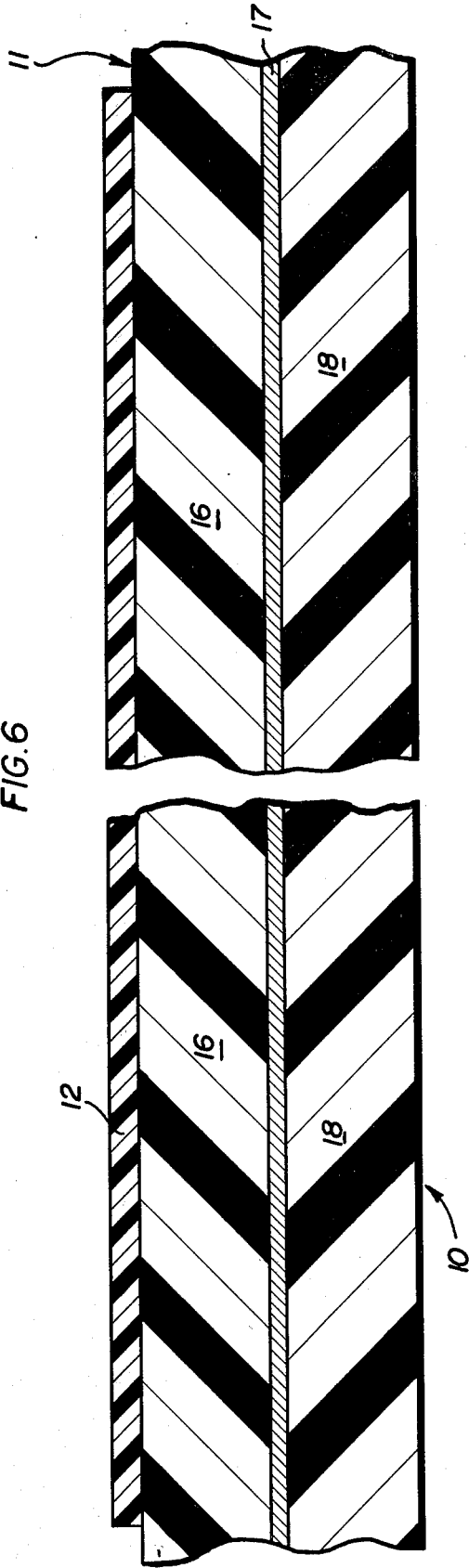
FIG. 6 is a sectional view similar to FIG. 5, and showing an alternate embodiment of the novel product.

Turning first to FIGS. 4-6 inclusive, there is shown a novel striped canvas-like laminate product. This product 10 can be generally considered to include a base laminate 11 upon which stripes 12, 13, 14 are applied. In accordance with the invention, these stripes exhibit relatively great imperviousness to ordinary wear and tear, and resistance to cracking fading, and abrasion. To this end, the laminate includes one or more relatively thin stripes of polyvinyl chloride film, 12, 13 and 14 which are heat-bonded to the laminate 11.

As best seen in FIGS. 5 and 6, this laminate 11 can be of the two-ply or three-ply variety. In the two-ply variety, the first or top ply sheet 16 is bonded, by heat and by a plastisol bonding agent 17, to a bottom ply or sheet of material such as plasticized polyvinyl chloride film 18. This bottom play 18 can also be a textile; the textile stock material can be cotton, nylon, a suitable polyolefin, or a blend of such suitable materials.

In the three-ply laminate illustrated in FIG. 5, an intermediate ply is included. Here, this intermediate ply 19 is an open woven polyester or nylon scrim 19. Typically, these sheets can each have a thickness on the order of 6 mils, and the stripe vinyl can have a thickness on the order of 2½ mils. Materials other than polyvinyl chloride, such as suitable nylons or polyolefins could be used to form the sheets. The bonding agent can be dioctyl phthalate.

Figure 1:
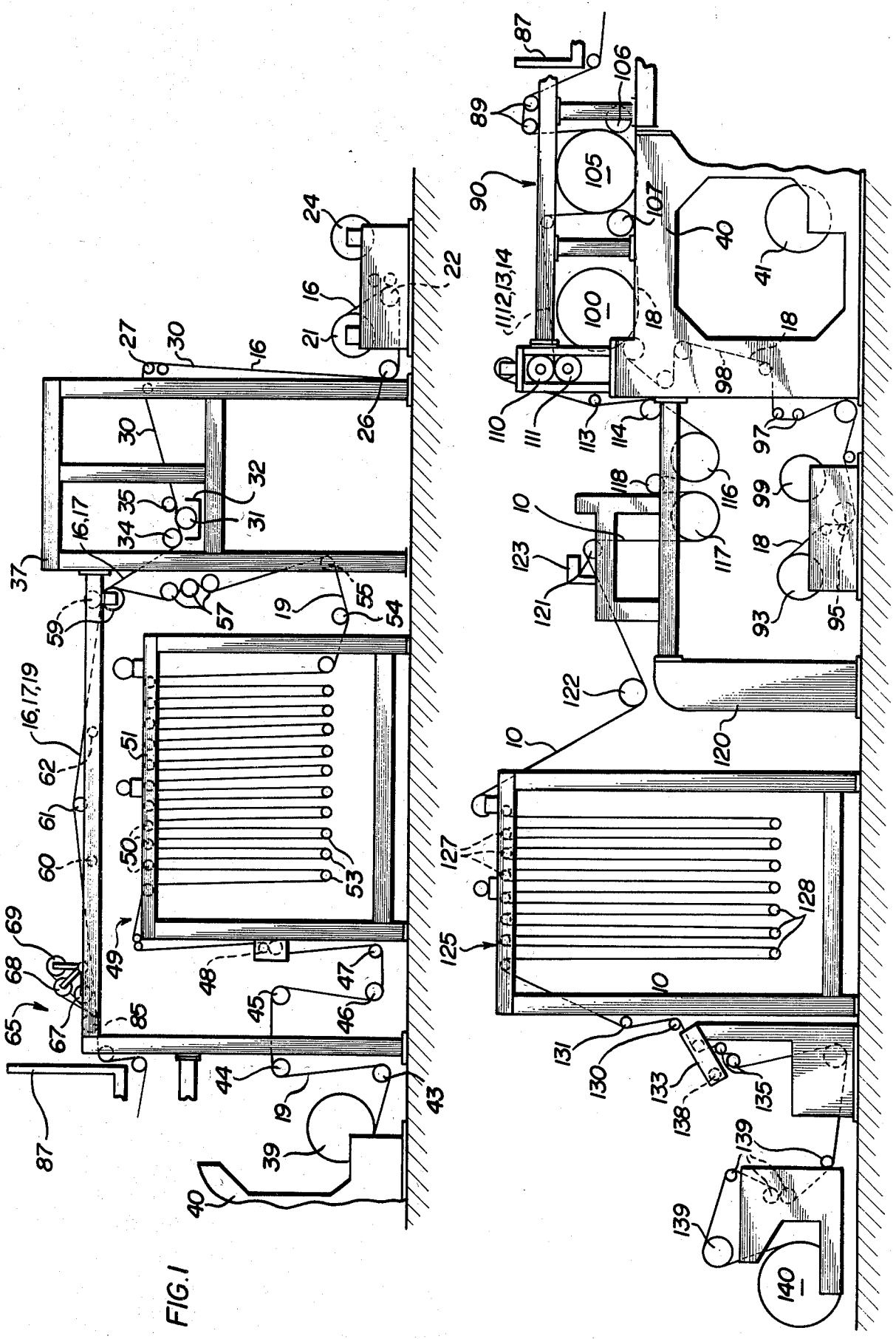
FIG. 1 is a side elevational view, showing in somewhat schematic form apparatus adapted to produce the novel product, that apparatus view being broken at a general mid-point for clarity.

In accordance with another aspect of the invention, this striped material can be manufactured rapidly and at relatively low cost by using the apparatus illustrated in FIGS. 1-3. In the embodiment illustrated there, the three-ply material illustrated in FIG. 5 is being manufactured. In FIG. 1, the top ply film or material 16 is continuously drawn from a first payout or supply roll 21 through alignment mechanism 22. A second roll 24 of top ply film or material 16 can be mounted upon appropriate journals adjacent the first roll 21; the fore-end of this rolled sheet material can be attached to the tail of the payout roll 21 with a "flying splice" as it passes through the alignment mechanism 22 in known manner. By using supply rolls 21 and 24 in this way, an endless supply of material can be passed through the machine.

After the material leaves the payout roll 21 and passes through the alignment mechanism 22, it next travels over an idler roll 26 and further alignment mechanism 27. The top ply material 16 is then passed over an adhesive dispenser or applicator roll 31 which applies the bonding agent 17 to an underside 30 of the top ply material 16 by conveying the plasticizing material from a trough 32 to the adjacent surface 30. Guide rollers 34 and 35 position the top ply material 16 as it passes over the applicator roll 31. Bonding agent constituents are automatically added to the trough 32 by known apparatus not shown. The applicator trough 32 and the applicator roll 31 are here carried upon an elevated mounting structure 37 to provide easy access for maintenance and repair to the various parts, and to position the material web for subsequent operations.

When three-ply material is produced, the open woven scrim 19 is drawn from a supply roll 39 which can be conveniently mounted in the interior of the machine upon journaling structure 40. Again, a supply roll 41 can be mounted closely adjacent the payout roll 39, and "flying splices" can be made to provide an endless supply of scrim material for the manufacturing process. Scrim material 19 coming from the payout or supply roll 39 passes over intermediate positioning, alignment, tensioning and idler rolls 43–47 inclusive. The scrim material 19 then passes through a final tensioner device 48, and into a festooner 49 having upper rolls 50 which are journaled upon a fixed support 51, and lower rolls 53 which are mounted not only for rotation, but for vertical motion within the festooner 49.

It will be observed that an appreciable length of scrim 19 web is maintained within the festooner 49. This permits the machine operators to halt rotation of the scrim payout roll 39 for adjustment or other reasons, and yet permit withdrawal of scrim web 19 through idler and alignment rollers 54 and 55 at the opposite end of the festooner 49. In this way, uninterrupted machine operation continues even while a portion of the web is halted for alignement, adjustment, or attachment of further web sections. If customer requirements demand, a relatively lightweight two-ply laminate product like that shown in FIG. 6 can be manufactured by simply eliminating the scrim web 19.

When it is included, the web 19 next passes through expander rolls 57 and thence to leadin rolls 59 where the expanded web 19 is mated with the top ply material 16. These material webs 16 and 19 then pass through guide rollers 60–62 inclusive to a work or stripe mating station 65.

At the stripe mating station 65 the striped film or material 12, 13 and 14 is initially applied over the top ply laminate sheet 16. Here, stripe payout or supply rolls 67, 68 and 69 are mounted upon free-ended arms 73, 74 and 75 respectively. These arms 73–75 are, in turn, mounted upon a transverse brace 77 as by clamps 78 of known variety. Air chucks 80, 81 and 82 at the arm free ends encourage the stripe supply rolls 67–69 inclusive to rotate freely so as to pay out the striping material 12, 13 and 14 without adding undue tension to the stripes and without causing material misalignment in downstream portions of the apparatus. An alignment and preliminary press roll 85 serves to preliminarily guide and orient the striped material 12, 13 and 14 for application to the underlying top ply 16 of the laminate 11.

It will be noted that the stripe carrying free arms 73, 74 and 75 are carried in different planes of angular incidence to the web material laminate 11 and to the transverse mounting brace 77. In accordance with the invention, stripe pay-out rolls 67–69 can provide striped material 12–14 of relatively great width to the laminate 11 in relatively close transverse proximity to one another and with relatively narrow spaces between the stripes, even though the journaling air chucks 80–82 extend axially outwardly from the material rolls and would otherwise interfere with one another. For example, as illustrated particularly in FIG. 4, it is possible with this arrangement to provide red stripes 12 and 14 in alternating sequence with blue stripes 13 upon a white laminate background 11. These stripes can be of four inch width, and can be spaced but four inches apart from one another, thus providing a regularized red, white and blue stripe appearance to the finished product.

An inspection and service catwalk 87 is located adjacent to the striping station 65. The striped and preliminarily prepared material passes under the catwalk 87, and next passes over idler rollers 89 to a heat bonding work station 90 shown in the bottom portion of FIG. 1, and in FIG. 3. At the bonding station 90, the bottom ply film or material 18 is introduced to the top ply material 16 and scrim 19 and bonding agent 17 to form the finished product. This bottom ply film or material 18 is drawn from a second payout or supply roll 93 and is pulled through preliminary positioner and alignment guidance and straightening roll mechanism 95 similar to the top ply alignment mechanism 22. The material then passes through idler rollers 97 and past an adjustment station 98. Another supply roll 99 of the web material 18 can be conveniently journaled adjacent the alignment station roller 95. The fore-end to this supply roll can be attached with a "flying splice" to the trailing end of the web 18 to provide a continuous supply of scrim material for production.

The bottom web 18 is next introduced to a secondary heat drum 100, which raises the web temperature so as to soften it and reduce its "memory". As the web 18 leaves the secondary heating roll 100, it is also drawn to the heat bonding station 90.

At the heat bonding station 90, a primary heating roller 105 receives the stripes and top portion of the laminate, and has this material impressed against it by a secondary nip roller 106. As the material passes around the drum periphery, the material is heated sufficiently to lose its elasticity and plastic memory, and to drive off water from the adhesive, leaving a vinyl adhesive base compatible with the vinyl sheets. Pressure applied by a primary nip roller 107 forces the bottom ply 18 against the woven scrim 19 and top ply 16 to form a unitized, strong, long-wearing laminate. Simultaneously, the striped material 12, 13 and 14 is heat-bonded to the top laminate ply 16. Although no bonding agent is used in providing the stripe to top ply bond, it has been found that the stripes are thus bonded in place in a permanent manner and will not crack, abrade, or tear away from the underlying laminate 11, and that a top surface of remarkable planarity is formed. Typically, the heat roller 105 and nip roller 107 apply a temperature of above 300° F. and a pressure of 3,000 psi to the webs.

After the bonded product leaves the heat station 90, the web is introduced to chill rolls 110 and 111 which are maintained at a reduced temperature as by refrigeration or the like. These chill rolls set the web and restore material memory and resistance to tearing or damage. Here, the bottom roll 111 has an embossing surface to form a pebbled texture on the material side opposite the striped side. This at least partly cooled web is now drawn over further idler and guidance rollers 113 and 114 to water rollers 116 and 117 and over an intermediate idler roller 118. Cooled water is passed through these water rollers 116 and 117 to further cool and set the finished product and return it to ambient or room temperature. These water rollers 116 and 117 can be conveniently supported from appropriate superstructure 120.

As the finished product 10 passes from the water rollers 116 and 117, it passes through intermediate and guidance rollers 121 and 122, where a printing station 123 can be actuated to add directions for product use or other information to the product 10.

The web is next introduced to a downstream festooner 125. Like the first festooner 49, this festooner 125 is provided with upper rollers 127 which are journaled in a fixed location, and with lower rollers 128 which are journaled for vertical motion. Thus, downstream portions of the web can be halted for inspection and repair, realignment, or removal from the production apparatus without halting operation of relatively upstream parts.

As the finished product 10 passes from the festooner 125, it is once again directed through guidance and idler rollers 130 and 131 before movement past an inspection station 133 and accommodating rollers 135. A fluorescent light 138 can be provided to conveniently illuminate the product web 10 and permit close inspection for high product quality. The inspected web then passes through final idler, alignment and guidance rollers 139 to a takeup or winding roll 140.

When so constructed, the finished product 10 can be produced at relatively low cost and at relatively great speed. When using 12 ounce fabric material, for example, the material can be moved through the machine at a rate of about 10 to 14 yards per minute.

The invention is claimed as follows:

1. A striped laminate material comprising a first polyvinyl chloride sheet having a thickness on the order of 6 mils, an open, flexible scrim sheet of serpentine interlaced strands, a second polyvinyl chloride flexible sheet having a thickness on the order of 6 mils, a plastisol bonding agent bonding the scrim between the first and second sheets, and at least one flexible stripe of polyvinyl chloride film having a thickness on the order of $2\frac{1}{2}$ mils and heat-bonded to the first sheet, the stripe being of a width less than the sheet to which the stripe is heat-bonded, and the stripe being impressed onto the sheet and into the laminate to provide a material having a striped surface of substantial planarity, and an embossed surface on the second sheet on a sheet side opposite the side upon which the stripe is heat-bonded.

2. A striped laminate material according to claim 1 wherein said bonding agent comprises dioctyl phthalate.

3. A striped laminate material according to claim 1 wherein said scrim sheet is a nylon sheet.

4. A striped laminate material according to claim 1, wherein said scrim sheet is a polyester sheet.

5. A striped laminate material according to claim 1, wherein at least one of said first or second sheets is a plasticized polyvinyl chloride sheet.

* * * * *